UNITED STATES PATENT OFFICE.

WILHELM HERZBERG AND OTTO SIEBERT, OF BERLIN, GERMANY, ASSIGNORS TO ACTIEN GESELLSCHAFT FÜR ANILIN FABRIKATION, OF BERLIN, GERMANY.

RED AZO DYE.

SPECIFICATION forming part of Letters Patent No. 704,826, dated July 15, 1902.

Application filed March 3, 1902. Serial No. 96,441. (Specimens.)

*To all whom it may concern:*

Be it known that we, WILHELM HERZBERG and OTTO SIEBERT, of Berlin, in the Kingdom of Prussia, German Empire, have invented new and useful Improvements in Red Azo Dye; and we do hereby declare that the following is a full, clear, and exact description of the invention, which will enable others skilled in the art to which it appertains to make and use the same.

We have discovered that para-substituted meta-amido-alphyl-sulfamido compounds represented by the typical formula:

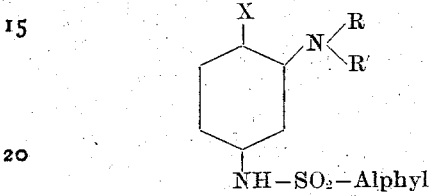

(in which X means a substituted group; R and R', hydrogen atoms, which may be replaced by alkyl radicals) constitute most valuable components for the production of azo dyestuffs when combined with diazo compounds of nitro derivatives of ortho-amidophenol. The dyestuffs thus formed dye wool directly in an acid-bath bordeaux-red shades. If the dyed goods be subjected to a subsequent treatment with chromates or if dyeing be effected in the way described in the United States Letters Patent No. 661,985, the shades become more bluish and get at the same time an extraordinary fastness to soaping, milling, and to the action of light or of sulfurous acid. As to the meta-amido-alphyl-sulfamido compounds which we employ as starting products, they may be easily obtained by condensing a para-substituted meta-nitroamin or a para-substituted mono-alkylated or a symmetrically-dialkylated meta-diamin of the benzene series with an aromatic sulfochlorid. In the first case a subsequent reduction is necessary in order to convert the nitro group into an amido group. For instance, the ortho-amido-para-toluol-para-sulfamido-toluol represented by the typical formula:

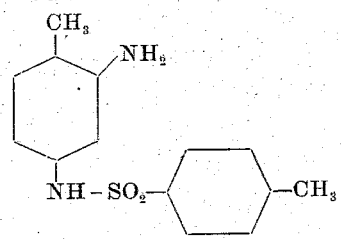

is prepared as follows: 15.2 parts of ortho-nitro-para-amido-toluol are suspended in one hundred and fifty parts of water, and while stirring well and heating the mixture on the water-bath twenty parts of para-toluolsulfochlorid are added thereto. In order to complete the reaction, six parts of sodium carbonate are gradually added. The condensation product thus formed may be directly filtered off. It is purified by re-solution in diluted alkali lye and reprecipitation by means of hydrochloric acid. It melts at 164° centigrade. In order to transform this nitro compound into the corresponding amido compound, it is subjected to the action of zinc-dust and hydrochloric acid or any other appropriate reducing agent.

The new product dissolves easily in diluted alkalies as well as in diluted mineral acids. From the solutions thus obtained it may be precipitated by the addition of acetic acid or sodium acetate, respectively. It forms a white crystallic powder melting at 160° centigrade.

The following example, in which the parts are by weight, may serve to illustrate the preparation of our new dyestuffs.

*Example—Manufacture of an azo dyestuff from picramic acid and ortho-amido-para-toluol-para-sulfamido-toluol.*—27.3 parts of ortho-amido-para-toluol-para-sulfamidotoluol are dissolved in five hundred parts of water on addition of four parts of caustic soda, and eleven parts of sodium carbonate are added thereto. To the solution obtained the diazo compound prepared in the well-known way from 21.4 parts of picramic acid is slowly run while cooling and stirring well. The new dyestuff, which is a sodium salt of an acid, having the formula

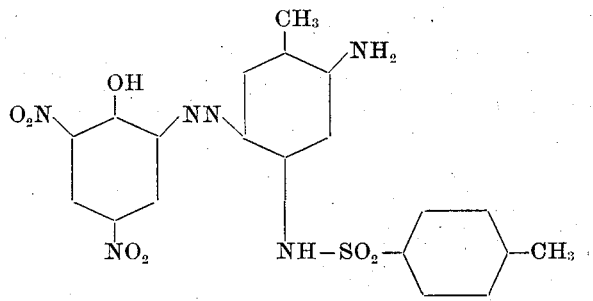

separates directly. It is filtered, pressed, and dried. It forms in the dry state a reddish-brown powder which dissolves in water to an orange-red solution. The aqueous solution turns more yellowish on addition of caustic-soda lye and separates a red precipitate on the addition of a mineral acid. It dissolves easily in concentrated sulfuric acid, forming a yellow solution. The alcoholic solution is red-colored. The new dyestuff produces on wool with the aid of chromium mordants intense bordeaux-red shades remarkable for their fastness to soaping and milling and to the action of light and sulfurous acid.

The result is not materially changed if for the picramic acid para-nitro-ortho-amidophenol is substituted or if the ortho-amido-para-toluol-para-sulfamido-toluol is replaced by another para-substituted meta-amido-alphyl-sulfamid.

Having now described our invention and in what manner the same is to be performed, what we claim as new is—

1. The herein-described new azo dyestuffs which are sodium salts of acids having the formula:

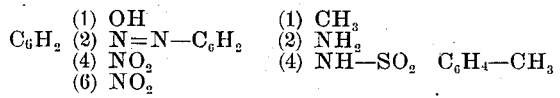

(in which Y means a hydrogen atom, which may be replaced by a nitro group, X a substituting group, and R and R' hydrogen atoms which may be replaced by alkyl radicals) and which are obtained by combining the diazo compound of a nitro derivative of ortho-amidophenol with a para-substituted meta-amido-alphyl-sulfamid; said dyestuffs forming in the dry state reddish-brown powders, soluble in water to orange-red solutions; the aqueous solutions turning somewhat more yellowish on addition of caustic-soda lye and separating red precipitates on the addition of mineral acids; the dyestuffs dissolving readily in concentrated sulfuric acid to yellow solutions and in alcohol to red solutions; the dyes producing on wool with the aid of chromium mordants bordeaux-red shades of great intensity and fastness.

2. The herein-described new dyestuff which is a sodium salt of an acid having the formula:

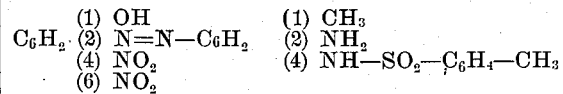

and which is obtained by combining diazotized picramic acid with ortho-amido-para-toluol-para-sulfamido-toluol; said dye forming in the dry state a reddish-brown powder, which dissolves in water to an orange-red solution; the aqueous solution turning more yellowish on addition of caustic-soda lye and separating a red precipitate on the addition of a mineral acid; the dye dissolving easily in concentrated sulfuric acid forming a yellow solution; dissolving in alcohol to a red solution; the dye producing on wool with the aid of chromium mordants intense bordeaux-red shades of great intensity and fastness.

In witness whereof we have hereunto signed our names, this 15th day of February, 1902, in the presence of two subscribing witnesses.

WILHELM HERZBERG.
OTTO SIEBERT.

Witnesses:
HENRY HASPER,
WOLDEMAR HAUPT.